United States Patent [19]

Copeland et al.

[11] Patent Number: 4,996,073
[45] Date of Patent: Feb. 26, 1991

[54] METHOD AND COMPOSITION FOR REMOVING OXYGEN FROM SOLUTIONS CONTAINING ALCOHOLS AND/OR ACIDS

[75] Inventors: James C. Copeland, Ashland, Ohio; Howard I. Adler, Oak Ridge; Weldon D. Crow, Knoxville, both of Tenn.

[73] Assignee: Oxyrase, Inc., Ashland, Ohio

[21] Appl. No.: 399,870

[22] Filed: Aug. 29, 1989

[51] Int. Cl.$^5$ .......................... C12G 1/00; C12H 1/00
[52] U.S. Cl. .................................. 426/487; 426/541; 426/544; 426/592; 435/161; 435/262; 435/264; 435/801; 435/820
[58] Field of Search ............... 435/801, 284, 262, 264, 435/801, 820; 426/487, 541, 544, 592

[56] References Cited

U.S. PATENT DOCUMENTS 4,476,224  10/1984  Adler ................................ 435/820

OTHER PUBLICATIONS

Edsall et al.-Advances in Protein Chemistry, vol. III (1947) Acad. Press pp. 391-392, 418-419 & 439-442.
Minoru et al.-Methods in Enzymology, vol. 89, (1982), pp. 491-497.
Matsushita et al.-Chem. Abst., vol. 104 (1986), p. 65496b.
Muraoka et al.-Chem. Abst., vol. 96 (1982), p. 138668n.

*Primary Examiner*—Sam Rosen
*Attorney, Agent, or Firm*—Fay, Sharpe, Beall, Fagan, Minnich & McKee

[57] ABSTRACT

The present invention is directed to a novel method, composition and device for removing dissolved oxygen from solutions containing alcohols and/or acids. By removing oxygen from various products, the present invention is an effective antioxidant for beverages and food products, as well as for industrial and commercial solutions containing alcohols and/or acids.

18 Claims, No Drawings

METHOD AND COMPOSITION FOR REMOVING OXYGEN FROM SOLUTIONS CONTAINING ALCOHOLS AND/OR ACIDS

BACKGROUND OF THE INVENTION

The present invention relates to a method, composition and device for removing dissolved oxygen from solutions containing alcohols and/or acids. The dissolved oxygen is removed from these solutions for the purposes of retarding oxidation deterioration, rancidity, gum formation, etc.

Ethyl alcohol, or ethanol ($CH_3CH_2OH$), is the basis for the very large and prosperous alcoholic beverage industry which offers a wide range of products varying in alcohol content from less than one percent to greater than sixty percent. In addition, ethyl alcohol, is also utilized industrially as an intermediate reagent in numerous processes for the production of chemicals etc., and is used extensively in solvents, antiseptics, anti-freezing compounds, and fuels.

In this regard, specifically denatured alcohols (i.e. ethyl alcohol containing added denaturants such as methyl alcohol, pyridine, benzene, kerosene, mixtures of primary and secondary aliphatic higher alcohols etc.) have many uses including use in food extracts, toiletries, pharmaceuticals, and cleaning products. As an industrial solvent, it is reported that ethyl alcohol is second to only water, and is a critical raw material in the manufacture of drugs, plastics, lacquers, polishes, plasticizers, perfumes etc.

Moreover, ethyl alcohol, either alone or in combination with a wide variety of petroleum products, may be burned as a fuel. Mixtures of ethyl alcohol blended with various petroleum distillates are frequently referred to by the term "gasohol".

Ethyl alcohol may be produced either synthetically from ethylene (i.e., by either the direct or indirect hydration of ethylene) or by the natural fermentation of sugars, starches or cellulose. While natural fermentation is still the principal means for producing the alcoholic content found in beverages and food products, the synthetic process is the method most frequently used in the production of ethyl alcohol for commercial use.

In the natural fermentation of ethyl alcohol, the ethanol may be derived from any material which contains sugar. In this regard, the sugar present in the raw material can be converted directly to ethyl alcohol, or if the sugar is contained in the raw material in more complex forms (such as starches or cellulose), the complex forms must first be converted to simple sugars by hydrolysis, etc. The sugars are then fermented by enzymes from yeast etc. to produce the ethyl alcohol.

An example of the production of ethyl alcohol from complex forms of sugar is the alcoholic fermentation of starchy raw materials in beer production. More particularly, beer is generally defined as an alcoholic beverage made by the fermentation of starchy materials such as barley, along with other brewing ingredients such as corn, rice, wheat or oats. The starchy materials are broken down by enzymes (i.e. hydrolyzed) during the malting process to produce less complex water soluble compounds such as sugars and short chained peptides. The sugars are then fermented to produce the alcoholic content of the beer, which varies greatly depending upon the critical ingredients and processes utilized.

Along this line, most beers have an ethyl alcohol content of between 2-6 weight percent. In addition, the alcoholic fermentation reaction also yields minor by-products such as glycol, higher alcohols (fusel oil comprising a mixture of n-propyl, n-butyl, isobutyl, amyl and isoamyl alcohols) and traces of acetaldehyde, acetic acid and lactic acid. These minor by-products are generally produced in almost all types of alcoholic fermentation reactions.

An example of the production of ethyl alcohol from simpler forms of sugars is the natural fermentation process which occurs in wine production. Although the production of wine is generally associated with the fermentation of sugar from the juices of grapes, juices from other fruits and plant material such as rice etc. may be utilized. The alcoholic content in wine varies greatly from less than 5 weight percent to greater than 18 percent.

Although beer, wine and other alcoholic beverages and food products are somewhat immune to microbial spoilage as a result of their ethyl alcohol content and/or low pH, oxidation deterioration still occurs. In this regard, it is well known that the presence of oxygen in products, including products containing ethyl alcohol and/or acids, can cause a great deal of detrimental damage. For example, carbonated and non-carbonated beverages and food products having low pH's and/or containing ethyl alcohol such as fruit juices, soft drinks, beer, wine, jams, jellies, and preserves, pie fillings, salad dressings, pickles, relishes, and other condiments, olives, sauerkraut, soups, vegetable juices, and pastes, etc. may be unstable over even a relatively short period of time due to undesirable changes produced by oxidative deterioration. Among the oxidative changes which beverages and food products incur over time include changes in color, consistency, and flavor. Since these changes in the beverages and food products greatly decrease the product's marketability, it is desirable to reduce the presence of oxygen in the overall product.

In addition, it is also quite desirous to remove oxygen from various commercial products having low pH's and/or contain ethyl alcohol. This is particularly true in a number of chemical products, wherein the presence of oxygen can create undesirable by-products. For example, in pharmaceutical products, it is often quite beneficial to remove oxygen to avoid contamination, formation of intermediate free radicals, etc.

Furthermore, it is also advantageous to remove oxygen from low pH and/or ethyl alcohol containing products which are stored for relatively long periods of time in order to maintain the packaging of the product. For example, if oxygen is present in the beverage and/or food product, the oxygen included in the product can also cause deterioration of the container's plastic or metal lining, packaging etc. Thus, in modern beverage and food product preparation systems, it is desirable to remove the extraneous oxygen from the fluids to greatly increase the shelf life of the packaged product.

This is particularly important in modern brewing operations, wherein the feed stock must be almost completely deoxygenated in that the presence of even a small fraction of oxygen can result in an unacceptable product. As a result, in modern beverage and food product operations, various deoxygenating devices including vacuum systems, oxygen-purging apparatuses, etc. are used to extract the oxygen.

However, vacuum dereators and gas flushing apparatuses are fairly expensive and they do not necessarily reduce the dissolve oxygen content to an acceptable level. Furthermore, these apparatuses have some drawbacks in that the oils and lubricants used therein sometimes find their way into the fluids being treated. The inclusion of even a small amount of such harmful agents within the beverage and/or food product can produce undesirable color and/or flavor changes in the overall product, as well as toxic effects.

In addition, in order to remove some of the oxygen which slips by the vacuum dearators and/or the gas-flushing apparatuses, it is sometimes desirable to add various chemical antioxidants to the product for the purposes of retarding oxidation and associated deterioration. However, a number of chemical antioxidants useful in industrial products such as plastics and polishes, are not suited for food products because of their toxicity. Moreover, the consuming public is becoming increasingly more concerned about the uses of chemicals and preservatives in foods and beverages including antioxidants. Thus, a great deal of research is currently being undertaken to develop not only more universal, but also safer, antioxidants.

Chemical antioxidants are inorganic or organic compounds added to various materials for the purposes of retarding oxidation and associated deterioration. They may be utilized alone or in combination with deoxygenating processes such as those indicated above. It is thought that some of the chemical antioxidants operate by binding with specific intermediate free radicals (i.e. peroxy radicals) produced during oxidation degradation. By binding with the intermediate free radicals, the free radicals are incapable of propagating the chain reaction to decompose into other harmful free radicals. As a result, by binding with the intermediate reactant, antioxidants effectively inhibit the oxidation degradation reaction. A more detailed explanation concerning the operating mechanism of antioxidants may be found in Van Nostrand Reinhold Encyclopedia of Chemistry. Fourth Edition, 1984.

The use of antioxidants in foods, pharmaceuticals, and animal feeds, as direct additives is closely regulated because of their potential toxicity. Along this line, when used in foods, chemical antioxidants are regulated to extremely low percentages by the Food and Drug Administration (FDA). Although antioxidants have been utilized for several decades and occur naturally in some food substances, intensive research continues in order to develop universal non-toxic antioxidants.

In this regard, the desirable properties of antioxidants, particularly when used in food products, may be summarized as indicated by Van Nostrand Reinhold, supra, by the following characteristics: (1) effectiveness at low concentrations; (2) compatibility with the substrate; (3) non-toxicity to consumers; (4) stability in terms of conditions encountered in processing and storage, including temperature, radiation, pH, etc.; (5) non-volatility and non-extractability under the conditions of use; (6) ease and safety in handling; (7) freedom from off-flavors, off-odors, and off-colors that might be imparted to the food products; and (8) cost effectiveness. As a result, antioxidants vary greatly depending upon such factors as the composition of the substrates, pH, temperature, processing conditions, impurities etc.

An example of a common chemical antioxidant currently being utilized in products containing alcohols and/or acids is the use of sulfur dioxide gas ($SO_2$) and its related sulfite salts (i.e. sodium sulfite, potassium metabisulfite etc.) Sulfur dioxide gas and its sulfite salts are widely used for preserving fruits and fruit juices, alcoholic beverages produced from fruit juices, vegetables and vegetable juices, syrups, concentrates, purees etc. In addition, sulfur dioxide and its sulfite salts also extend the storage life of raw fruit and vegetables by preventing the enzymatic "browning" reactions associated with oxidative degradation.

The effectiveness of sulfur dioxide gas and its sulfite salts varies considerably depending upon the concentration and pH conditions of the product desired to be protected. The preferred operating pH range of sulfur dioxide and its sulfite salts for preventing oxidation and inhibiting microbial degradation appears to be about a pH of 2.5–3.5.

As a result of this effective pH range, sulfur dioxide and its sulfite salts are used extensively in the production and storage of wine. The sulfites are used not only for sanitizing equipment etc., but also for inhibiting the growth of any natural microbial flora present on the fruit prior to fermentation. This is done prior to the addition of pure cultures of the appropriate wine making yeast to prevent growth and competition of undesirable organisms. During fermentation, the sulfites act not only as an antioxidant but also as a clarifier and dissolving agent. Furthermore, sulfur dioxide and its sulfite salts are often used after fermentation and during storage to prevent oxidation degradation and/or undesirable postfermentation alterations by various microorganisms. The levels of sulfur dioxide and its sulfite salts present in wine during storage varies greatly depending upon the condition of the fruit, temperature, pH, sugar concentrations etc. but is normally in the range from about 20 to about 70 ppm.

Although the use of sulfur dioxide and other chemical antioxidants has proven to be quite beneficial for controlling oxidative degradation of various products, including those products containing alcohols and/or acids, a number of serious undesirable side effects can also be produced. This can be particularly demonstrated in regard to the use of sulfur dioxide and/or sodium sulfite as a chemical antioxidant in wine, fruit juices etc. wherein a portion of the public is allergic and/or hypersensitive to the sulfites utilized. Hence, it would be desirous to produce a safe, non-toxic substance which continuously removes oxygen from food products and chemical substances containing alcohols and/or acids without producing any harmful side effects to the end products or user.

Accordingly, the present invention is directed to a method, composition and device for continuously removing oxygen from solutions containing alcohols and/or acids in a safe and efficient manner. The method and composition of the present invention may be utilized as an antioxidant in industrial solutions containing acids and/or alcohols such as plastics, polishes etc., as well as beverages and food products, without altering the desired properties of the products produced thereby. The method and composition of the invention fulfill the desired properties of an effective antioxidant as indicated above.

SUMMARY OF THE INVENTION

In one aspect, the present invention is directed to a method for removing oxygen from a solution containing alcohol. The method comprises the steps of providing a solution containing alcohol and oxygen; and, adding to the solution a sufficient amount of oxygen scavenging membrane fragments to reduce the oxygen present in the solution to water. The oxygen scavenging membrane fragments utilized in the invention contain an electron transport system which is sufficiently effective (i.e. active) in a solution containing alcohol to reduce oxygen to water.

In another aspect, the present invention relates to a device for removing oxygen from a contained alcohol solution. The device comprises a means for containing an alcohol solution having a solution contact surface and non-solution contact surface, wherein the solution contact surface contains a sufficient amount of oxygen scavenging membrane fragments to reduce the oxygen present in the solution to water.

In an additional aspect, the present invention is directed to a deoxidizing agent for reducing the dissolved oxygen concentration of a solution containing alcohols. The deoxidizing agent consists of membrane fragments which possess an electron transport system that reduces oxygen to water in solutions containing alcohols.

In a further aspect, the present invention relates to a method for removing oxygen from an acidic solution. The method comprises the steps of providing an acidic solution containing oxygen; and, adding to the acidic solution a sufficient amount of oxygen scavenging membrane fragments to reduce the oxygen present in the solution to water.

In still another aspect, the present invention is directed to a method for removing oxygen from an acidic solution. The method comprises the steps of providing an acidic solution containing oxygen; and, adding to the acidic solution a sufficient amount of oxygen scavenging membrane fragments from an organism of the genus Acetobacter to reduce the oxygen present in the solution to water.

In still a further aspect, the present invention relates to a deoxidizing agent for reducing the dissolved oxygen concentration of an acidic solution. The deoxidizing agent consists of membrane fragments which possess an electron transport system that reduces oxygen to water in solutions containing acids. More particularly, the present invention is directed to a deoxidizing agent for removing the dissolved oxygen from an acidic solution wherein the deoxygenating agent consists of membrane fragments of an organism from the genus Acetobacter.

In an additional aspect, the present invention is directed to a device for removing oxygen from a contained acidic solution. The device comprises a means for containing an acidic solution having a solution contact surface and a non-solution contact surface, wherein said solution contact surface contains a sufficient amount of oxygen scavenging membrane fragments to reduce the oxygen present in the solution to water.

In a still another aspect, the present invention relates to a method for removing oxygen from a solution containing both acids and alcohols. The method comprises the steps of providing an acidic ethanol solution containing oxygen; and, adding to the acidic ethanol solution a sufficient amount of oxygen scavenging membrane fragments from an organism of the genus Acetobacter to reduce the oxygen present in the solution to water.

In a still further aspect, the present invention is directed to a method for preventing the enzymatic browning reaction of sliced fruits and/or vegetables. The method comprises the steps of providing fruit and/or vegetables which have been cut or sliced; and, coating the exposed area with a solution containing a sufficient amount of oxygen scavenging membrane fragments to prevent oxidation deterioration from occurring.

DETAILED DESCRIPTION OF THE INVENTION

The present invention is directed to a novel method, composition and device for removing dissolved oxygen from solutions containing alcohols and/or acids. By removing oxygen from various products, the present invention is an effective antioxidant for beverages and food products, as well as for industrial and commercial solutions containing alcohols and/or acids.

More particularly, one embodiment of the present invention relates to a method and device for removing oxygen from solutions containing alcohol through the use of oxygen scavenging membrane fragments. The membrane fragments, which contain an electron transport system that reduces oxygen to water, may be obtained from various sources. For example, the membrane fragments may be obtained from the cell membranes of various bacteria, such as the organism *Escherichia coli*, and/or from the mitochondria membranes of non-bacterial organisms. Although it was known that cell membrane fragments from various bacteria, such as the organism *Escherichia coli*, possessed an electron transport system consisting of a series of enzymes that worked in cooperation with one another to reduce oxygen to water, it was thought that as a result of the normal intolerance of enzymes to alcohols such as ethanol, the electron transport system present in the cell and/or mitochondrial membrane fragments would have been ineffective in solutions containing alcohol.

However, as more particularly demonstrated below, the experimental results collected by the present inventors clearly indicate that when the pH of solutions containing acids and/or alcohols, such as wine, were adjusted to a pH within normal operating ranges of a particular preparation of oxygen scavenging enzymes present in the membrane fragments (i.e. the electron transport system of cell membrane fragments from the organism *Escherichia coli* has a normal pH range of about 5.5 to about 9.5, with an optimal pH of 8.4), the enzymes present in the membrane fragments were still very effective in reducing the oxygen to water and thus removing the oxygen from the product.

As stated above, this was greatly unexpected because it is well known that ethyl alcohol denatures enzymes and other proteins (Fruton and Sinmonds, General Biochemistry, Second Edition, John Wiley & Sons, 1958).

In addition, further testing by the present inventors indicated that even if very little of the membrane fragments were added to the solutions containing alcohol, such as ethanol (i.e. wine etc.), and the pH of the solutions were adjusted to a pH range within the normal operating parameters of the membrane fragments, the very low activities of the enzymes present within the membrane fragments were sufficient to remove all of the dissolved oxygen present in the solutions in a relatively short period of time. This was a significant result, in that the lower effective level of the membrane fragments, the lower the probability of any adverse effects (i.e. changes in odor, taste and appearance) occurring in the desired end product.

Furthermore, when the antioxidant properties of the membrane fragments utilized in the present invention were compared with known antioxidants of solutions containing alcohol, such as the sulfites used in wine, the results indicated (see below) that the membrane fragments utilized in the present invention were much more effective than the prior art. More particularly, the results indicated that when membrane fragments possessing the critical electron transport system of the present invention were added to a pH adjusted solution containing ethyl alcohol (i.e. wine), the electron transport system utilized in the present system immediately reduced the dissolved oxygen concentrations to very low levels and maintained them there throughout the testing period (which was for approximately eight weeks) at temperatures higher than that normally used for storing wine. In contrast, the current commercial method used (i.e. sulfited wines) showed a slow and protracted reduction of dissolved oxygen concentration over the testing period.

Moreover, when after the eight week testing period was completed and the bottles of wine were open and reoxygenated, only the wine containing the membrane fragments possessing the electron transport system used in the present invention showed a reduction in the reintroduced oxygen with time. Hence, the membrane fragments utilized in the present invention clearly operated as a more effective antioxidant in solutions containing ethanol than the current commercial methods utilized.

The oxygen scavenging bacterial cell membrane fragments utilized in the present invention, as well as the process for isolating and purifying same, are similar to the membrane fragments and filtration process disclosed in U.S. Pat. No. 4,476,224 for "Material and Method for Promoting the Growth of Anaerobic Bacteria", issued on Oct. 9, 1984 to Howard I. Adler, Oak Ridge, Tenn., one of the co-inventors of the present invention. The '224 patent is incorporated herein by reference.

The '224 patent is directed to a method of removing dissolved oxygen from a nutrient medium for anaerobic bacteria through the use of sterile membrane fragments derived from bacteria having membranes which contain an electron transport system which reduces oxygen to water in the presence of a hydrogen donor in the nutrient medium. It is known that a great number of bacteria have cytoplasmic membranes which contain the electron transport system that effectively reduces oxygen to water if a suitable hydrogen donor is present in the medium. Some of the bacterial sources identified in the '244 patent include *Escherichia coli, Salmonella typhimurium, Gluconobacter oxydans*, and *Pseudomonas aeruginosa*. These bacterial membranes have been highly effective in removing oxygen from media and other aqueous and semi-solid environments.

The same oxygen reducing effects produced by the cell membrane fragments from the bacterial sources indicated above, are also present in the membrane of mitochondrial organelles of a large number of higher non-bacterial organisms. More particularly, a great number of fungi, yeasts, and plants and animals have mitochondria that reduces oxygen to water, if a suitable hydrogen donor is present in the medium. Some of the sources of oxygen reducing membranes from these mitochondria are: beef heart muscle, potato tuber, spinach, Saccharomyces, Neurospora, Aspergillus, Euglena and Chlamydomonas. The process of producing the useful mitochondrial membrane fragments involves the following steps:

1. Yeast, fungal cells, algae and protozoa, having mitochondrial membranes containing an electron transfer system which reduces oxygen to water, are grown under suitable conditions of active aeration and a temperature which is conducive to the growth of the cells, usually about 20° C. to 45° C. in a broth media. Alternately, mitochondria may be obtained from cells of animal or plant origin.
2. The cells are collected by centrifugation or filtration, and are washed with distilled water.
3. For the preparation of crude mitochondrial membrane fragments, a concentrated suspension of the cells is treated to break up the cell walls and mitochondria. This is accomplished by known means, for example, by ultrasonic treatment or by passing the suspension several times through a French pressure cell at 20,000 psi.
4. The cellular debris is removed by low speed centrifugation or by microfiltration (cross-flow filtration).
5. The supernatant or filtrate is subjected to high speed centrifugation (175,000×g at 5° C.) or ultrafiltration.
6. For the preparation of material of higher purity, the cells of step 2 are suspended in a buffer containing 1.0M sucrose and are treated by means which break up the cell walls or membranes but leave the mitochondria intact. This is accomplished by known means, for example, by ultrasonic treatment, passage through a French pressure cell at low pressure, enzymatic digestion or high speed blending with glass beads.
7. The cellular debris from step 6 is removed by differential centrifugation or filtration.
8. The supernatant or retentate from step 7 is passed through a French Press at 20,000 psi to break the mitochondria into small pieces.
9. Mitochondria debris from step 7 is removed by centrifugation at 12,000×g for approximately 15 minutes or by microfiltration.
10. The supernatant or filtrate from step 9 is subjected to high speed centrifugation (175,000×g at 5° C.) or ultrafiltration.
11. The pellet or retentate from step 5 (crude mitochondrial fragments) or the pellet or retentate from step 10 (purified mitochondrial membrane fragments) are resuspended in a buffer solution at a pH of about 6.0 to about 8.0. A preferred buffer solution is 0.02M solution of N- 2-hydroxyethylpiperazine-N'-2-ethane sulfonic acid (HEPES).
12. The membrane fragments in the buffer solution are then passed under pressure through a filter having openings of about 0.2 microns.
13 The suspension is then stored at about −20° C. for later use or it may be freeze dried.

This process, as well as the media produced thereby, is the subject matter of a separately filed co-pending U.S. patent application, i.e. Ser. No. 938,190, filed on Dec. 5, 1986 for "Material and Method for Promoting Growth of Anaerobic Bacteria". The cell and/or mitochondrial membrane fragments utilized in the present invention are produced according to the processes set forth in the '224 patent and the above identified co-pending application.

The process of the present invention can be utilized for removing oxygen in a wide variety of aqueous solutions or semi-aqueous solutions containing alcohols. Examples of such solution containing alcohols, are those solutions containing ethanol including beverage and food products, such as beer and wine, as well as industrial products such as chemical solvents, antiseptics, antifreezing compounds and fuel.

Furthermore, while most natural beverage and food products do not require the addition of a hydrogen donor in order for the enzyme system present in the membrane fragments to reduce the oxygen present in the product to water, when synthetic ethanol containing solutions are utilized, the addition of a hydrogen donor (i.e. an organic substrate) may be necessary in order for the membrane fragments to perform their oxygen removing functions. Suitable hydrogen donors are lactic acid, succinic acid, alpha-glycerol phosphate, formic acid, malic acid and, where available their corresponding salts.

Moreover, the temperature of the reactant solution may also have to be adjusted to optimize the deoxygenation process. In this regard, the temperature range for activity is wide, from a low of 5° C. to a high of about 60° C. Operating under optimal conditions, the present invention can lower dissolved oxygen to approximately 0.1 ppm or below. The membrane fragments are equivalent in oxygen reducing ability to a strong, chemical reducing agent, such as sodium hydrosulfite.

In addition, while the oxygen scavenging membrane fragments may be added directly to the ethanol solution for the purposes of deoxygenating the solution, the membrane fragments may also be indirectly added to the ethanol solution by incorporating the membrane fragments into the solution-contact surface of the means utilized for containing the ethanol solution. In this regard, the membrane fragments can be incorporated into a large variety of solution-contact surfaces such as the polymeric liners of bottles and cans, the plastic container itself etc. By incorporating the membrane fragments into the solution-contact surfaces, the storage conditions of the packaged material are improved without directly effecting the solution.

An additional embodiment of the present invention is directed to a method and composition for removing oxygen from solutions containing acids. This embodiment is distinct from that set forth above in that the presence of ethyl alcohol in the solution is not necessary (although it can be present) and the pH of the solution need not be adjusted to the operational ranges required in the first embodiment.

The additional embodiment of the invention is a direct result of the discovery that not only are the membrane fragments effective antioxidants in solutions containing alcohols, the cell membrane fragments from certain organisms, such as the organisms of the genus Acetobacter, are also effective in removing oxygen from acidic solutions. This is particularly important because unlike the cell membrane fragments from the organism *Escherichia coli*, the cell membrane fragments from the organism of the genus Acetobacter are acceptable for food use. Hence, the cell membrane fragments from the organism of the genus Acetobacter are efficient antioxidants for beverage and food products in that the membrane fragments reduce or remove oxygen from solutions containing alcohols as well as acids.

More particularly, it was discovered that although a number of organisms can exist in acidic environments, not all of these organisms possess the properties necessary to be a safe and effective antioxidant suitable for use in food products and beverages. Along this line, the present inventors have discovered that cell membrane fragments from organisms of the genus Acetobacter remove oxygen not only from solutions containing alcohols, but also from those containing acids. These cell membrane fragments also fulfill the desired properties of an effective antioxidant set forth above.

Specifically, the present inventors have discovered that the electron transport system found in the cell membrane fragments of the organism *Acetobacter aceti* ATCC #23746 (NCIB 8554) remove all of the dissolved oxygen from acidic solutions containing alcohols in a relatively short period of time, i.e., the cell membrane fragments from the organism *Acetobacter aceti* ATCC #23746 removed all of the dissolved oxygen from white wine (pH of 3.4) in 79.1 minutes at 37° C. and 29.3 minutes at 32° C.) See Example 5 below. The oxygen scavenging properties of the cell membrane fragments of *Acetobacter aceti* are novel in that this is, to the inventors knowledge, the first time the properties of the fragments have been described.

Moreover, the data produced in the above discovery indicated that the optimum pH of the enzymes of the electron transport system present in the cell membrane fragments of *Acetobacter aceti* is about 5.2 and the operational range is from about 3 to 8.0. This is in sharp contrast to the electron transport system for the cell membrane fragments from *Escherichia coli* which has an optimum pH of 8.4 and a operational range from 6.0 to 9.0. Furthermore, the data indicated that the cell membrane fragments from the organism *Acetobacter aceti* were also quite effective in removing oxygen from non-alcoholic acidic solutions such as tomato juice (pH=4) and cola soft drinks (pH=3). The enzymes of the electron transport system from the *Escherichia coli* cell membrane fragments failed to produce any activity at these low pH's.

The process of the present invention directed to the removal of oxygen from acidic solutions can be used for removing oxygen in various acidic aqueous or semi-aqueous solutions. Examples of such solutions include carbonated and non-carbonated beverages and food products such as fruit juices, soft drinks, salad dressings, pickles, relish, and other condiments, olives, sauerkraut, vegetable juices, purees, jams, jellies and preserves, as well as industrial and/or commercial solutions containing acids. In addition, acidic solutions containing ethanol, such as beer and wine, may also be utilized. The cell membrane fragments of the organism of the genus Acetobacter can be added either (i) directly into the acid solutions, or (ii) indirectly by incorporating the membrane fragments into the solution-contact surface of the packaging container.

Furthermore, while most natural beverage and food products contain a sufficient amount of organic substrates to provide the hydrogen needed to reduce the oxygen present in the solution to water, additional hydrogen donors such as lactic acid, succinic acid, alpha-glycerol phosphate, formic acid, malic acid and/or their corresponding salts can also be added to the acidic solution, especially those designated for commercial use.

In addition, the present invention may also be utilized for preventing the enzymatic "browning" reaction which occurs in the oxidation degradation of fruits and vegetables. Specifically, the enzymes in fruits and vegetables cause apples, apricots, bananas, potatoes, among others, to darken when they are exposed to air after being cut, bruised or allowed to over mature. The membrane fragments of the present invention may be utilized in order to prevent and/or delay the enzymatic browning reaction from occurring.

As more particularly indicated by the data set forth below, the present inventors discovered that when the exposed portion of freshly cut fruits or vegetables were dipped or coated with a solution containing the membrane fragments of the present invention, the browning reaction which occurs in oxidative deterioration, was delayed. This was specifically true when the fruits or vegetables used with the cell membrane fragments of the organism *Escherichia coli* had a relatively neutral pH, i.e. potato has a pH=6.5. However, when the fruits or vegetables utilized were of low pH (i.e. less than 5), the cell membrane fragments from the organism *Escherichia coli* were ineffective in preventing the browning reaction from occurring. This is because the electron transport system of the cell membrane fragments of the organism *Escherichia coli* is inactive at such a low pH. This difficulty may be overcome by utilitizing membrane fragments having an electron transport system (such as cell membrane fragments from the organisms of the genus Acetobacter) which is effective in acidic solutions.

The following examples are set forth for the purpose of further illustrating the preferred embodiments of the present invention.

EXAMPLE 1

In order to determine the effectiveness of the electron transport system of the cell membrane fragments obtained from the organism *Escherichia coli* (i.e. "Oxyrase") in ethanol (ethyl alcohol) solutions, a sufficient amount of ethanol alcohol was added to three 0.34 units/ml of a suspension of the cell membrane fragments to provide solutions containing 0, 9.5 and 13.0 weight percent ethyl alcohol. In this regard, one unit of a suspension of the cell membrane fragments is the amount of membrane fragments that reduces 1.0% of dissolved oxygen per second per milliliter of a solution containing 1.75 ml of a 10 mM sodium lactate solution in 20mM phosphate buffer at a pH of 8.4 and a temperature of 37° C. The membrane fragments were either isolated and purified by the process set forth above (i.e., the process set forth in the '224 patent and/or the '190 application) or the membrane fragments were commercially purchased from Oxyrase, Inc., Ashland, Ohio. The pHs and temperatures of the three solutions were adjusted to produce solutions having a pH of 7, and a temperature of 37° C. Two control samples, one containing 1 unit of cell membrane fragments and the second containing phosphate buffer, were ran at 37° C. at a pH=8.4 with 0 weight percent ethanol. Sodium lactate was added to the solutions for the purposes of providing a substrate (i.e. hydrogen donor) for the reduction of oxygen to water.

Upon the addition of the cell membrane fragments to the two solutions, the amount of time (minutes) required for the electron system present in the membrane fragments to remove 100 weight percent oxygen from the ethanol samples was determined utilizing an oxygen sensor (Oxygraph 5/6, Gilson International, Middleton, Wisc.). The results of are set forth in Table 1.

TABLE 1

EFFECT OF ETHANOL ON THE ACTIVITY OF CELL MEMBRANE FRAGEMTS FROM THE ORGANISM *ESCHERICHIA COLI*

Time Required to Remove Oxygen (Minutes)

| % Oxygen Removed | pH 8.4 buffer | pH 7.0 buffer | pH 7.0 buffer + 9.5% ethanol | pH 7.0 buffer + 13.0% ethanol |
|---|---|---|---|---|
| 25 | 1.2 | 1.7 | 3.6 | 4.7 |
| 50 | 2.6 | 3.4 | 7.5 | 9.9 |
| 75 | 4.1 | 5.3 | 10.9 | 15.3 |
| 100 | 5.3 | 7.7 | 14.3 | 19.3 |

The data indicated that although affected somewhat by the pH and ethanol concentrations, the electron transport system present in the cell membrane fragments from the organism *Esherichia coli* performed in the presence of ethanol, particularly in the amount of ethanol normally found in wine. As indicated above, the tolerance of the electron transport system present in the cell membrane fragments was highly unexpected in that enzymes are often intolerant of ethanol.

EXAMPLE 2

A similar test to that set forth above was performed on wine samples provided by Andre Wines, Ltd., Winona, Ontario, Canada, in order to determine whether the electron transport systems present in the cell membrane fragments were effective in various natural solutions containing ethanol. Since the effectiveness of the cell membrane fragments as an antioxidant in wine was to be determined, the wine utilized did not contain chemical antioxidants such as potassium metabisulfite, sodium sulfite etc.

More particularly, 0.34 units/ml of a suspension of the cell membrane fragments from the organism *Escherichia coli* were added to the following wine samples provided by André

White wine used: 1988 Seyval—Residual Sugar=2.11 G/L

Sweet white used: 1988 Seyval—Residual Sugar=24.7 G/L

Red wine used: 1988 Dechaunac—Residual Sugar=3.8 G/L

The wine samples possessed ethanol concentrations of between 12 and 14%. Prior to the addition of the cell membrane fragments, the pHs and temperatures of the wine samples were raised to a pH of 7 and temperature of 37° C. in order to accommodate the activity of the cell membrane fragments from *Escherichia coli*. As a result of the inclusion in the various wine samples of natural hydrogen donating substrates such as lactic acid, the addition of an additional substrate was not required. The activities of the electron transport systems present in the *Escherichia coli* cell membrane fragments in the various wine samples were determined. The results are set forth below in Table 2.

TABLE 2

The Activities of Cell Membrane Fragments in Wine
Time Required to Remove Oxygen (Minutes)

| Percent Oxygen Removed | White Wine | Red Wine | Sparkling Wine |
|---|---|---|---|
| 25 | 2.4 | 2.4 | 1.4 |
| 50 | 5.7 | 5.4 | 3.7 |
| 75 | 9.7 | 9.4 | 6.8 |

TABLE 2-continued

The Activities of Cell Membrane Fragments in Wine
Time Required to Remove Oxygen (Minutes)

| Percent Oxygen Removed | White Wine | Red Wine | Sparkling Wine |
|---|---|---|---|
| 100 | 16.0 | 15.8 | 9.3 |

The data indicated that the electron transport system present in the *Escherichia coli* cell membrane fragments removed the dissolved oxygen in the wine samples completely in 9.3 to 16 minutes at 37° C. The test results demonstrated that the cell membrane fragments of *Escherichia coli* were an effective antioxidant of pH adjusted wine and other naturally produced ethanol containing solutions. Moreover, the results further indicated that in order to produce an antioxidant which was effective in natural products having low pHs, cell membrane fragments exhibiting electron transport systems having lower pH activity profiles were necessary.

EXAMPLE 3

In order to determine whether very low concentrations of the electron transport systems present in the cell membrane fragments would perform in solutions containing ethanol, the amount of time required to remove the oxygen in previous aerated wine samples containing 0.0075 units of the cell membrane fragments/ml at 33° C. was determined. In addition, the activity of the chemical antioxidant, potassium metabisulfite ($K_2S_2O_2$) in aerated wine, was also compared to the activity of the low concentration of cell membrane fragments from the organism *Escherichia coli* at a pH of 7. The results are set forth in Table 3 below.

TABLE 3

The Activities of Potassium Metabisulfite and Low Concentrations of Cell Membrane Fragments in Wine at a pH = 7
Time Required to Remove Oxygen (Minutes)

| Percent Oxygen Removed | Sweet, white wine + Oxyrase | Sweet, white wine + bisulfite | Dry, white wine + Oxyrase | Dry white wine + bisulfite |
|---|---|---|---|---|
| 25 | 6.3 | — | 5.3 | — |
| 50 | 18.0 | — | 24.0 | — |
| 75 | — | — | — | — |
| 100 | 60 min. (est.) | >150 min. (est.) | 50 min. (est.) | >320 min. (est.) |

Assays run at .0075 units oxygen/ml and 33° C.

The data indicated that even as little as 0.0075 units/ml of cell membrane fragments would remove all of the dissolved oxygen in about 50 to 60 minutes at 33° C. Furthermore, the results indicated that potassium metabisulfite, if it is effective at all, is much slower than the cell membrane fragments of the present invention.

The significance of the observation that only a very small amount of cell membrane fragments was necessary in order to remove oxygen from ethanol containing solutions is both practical and economic. The lower the effective level of the cell membrane fragments, the lower the probability of adverse effects on odor, taste and appearance. In addition, the lower the effective concentration, the greater the opportunity for commercial success.

EXAMPLE 4

The effectiveness of the electron transport system from the cell membrane fragments of the organism *Escherichia coli* (i.e. 2.5 MG/L OXYRASE) as an antioxidant was compared to the chemical antioxidant sulfur dioxide (50 MG/L free $SO_2$) in pH adjusted wines (i.e. pH=7). In this regard, the following André wines were utilized:

White Wine Used: 1988 Seyval—Res. Sug.=2.11 G/L

Sweet White Used: 1988 Seyval—Res. Sug.=24.7 G/L

Red Wine Used: 1988 Dechaunac—Res. Sug.=3.8 G/L

The wines were first clarified with ~350 MG/L bentonite (a colloidal clay, such as aluminum silicate, composed chiefly of montmorillonite) and filtered in the lab via a M-70 filter. The wines were treated and bottled. The bottles were then incubated at elevated temperatures (i.e. at 30° C. ±1° C.) to provide accelerated stability data. Periodically, the bottles were opened and their dissolved oxygen concentrations were determined as indicated below in Table 4.

TABLE 4

THE DISSOLVED OXYGEN (D.O.) CONCENTRATION IN WINE TREATED WITH VARIOUS ANTIOXIDANTS

| Sample | Day One D.O. | Two weeks D.O. | Four weeks D.O. | Six weeks D.O. | Eight weeks D.O. | Comments |
|---|---|---|---|---|---|---|
| Dry white wine - control | 8.90 | 2.23 | 1.23 | 0.690 | 0.360 | Oxyrase activity excellent |
| Dry white wine - sulfite | 8.90 | 0.480 | 0.220 | 0.190 | 0.180 | |
| Dry white wine - Oxyrase | 8.10 | 0.170 | 0.161 | 0.120 | 0.120 | |
| Sweet white wine - control | 9.10 | 1.90 | 0.820 | 0.440 | 0.320 | Oxyrase activity excellent |
| Sweet white wine - sulfite | 9.10 | 0.970 | 0.250 | 0.210 | 0.18 | |
| Sweet white wine - Oxyrase | 8.70 | 0.176 | 0.176 | 0.160 | 0.12 | |
| Dry red wine - control | 8.44 | 1.67 | 0.800 | 0.410 | 0.35 | Oxyrase activity excellent |
| Dry red wine - sulfite | 8.44 | 0.470 | 0.350 | 0.190 | 0.16 | |
| Dry red wine - Oxyrase | 8.10 | 0.120 | 0.130 | 0.130 | 0.12 | |

Note:
all units in MG/L

The data showed that the electron transport system present in the cell membrane fragments immediately reduced the dissolved oxygen concentrations to very low levels and maintained them there throughout the test for eight weeks. In contrast, the sulfite wines, the current commercial method used, showed a slow and protracted reduction of dissolved oxygen over the test period and did not reach the low levels produced by Oxyrase even after eight weeks.

It was further interesting to note that the untreated wine (control) also showed a reduction in dissolved oxygen that was slightly behind the sulfited wines. This indicated that the dissolved oxygen in the unprotected wines was reacting with the wine, (i.e. the wine itself was being reduced). This is precisely what vintners want to prevent. As a result, the data indicated that the use of sulfites, under these conditions, as an antioxidant was only marginal at best.

Furthermore, after eight weeks, the bottles of the sweet white wine were opened and reoxygenated by aerating the wine to its saturation point (~8.10 MG/L). After the bottles of the reoxygenated wine were kept outside at room temperature for seven days, the dissolved oxygen content of the reoxygenated wine was determined as indicated in Table 5.

TABLE 5

| Sample | Seven days D.O. (MG/L) |
| --- | --- |
| Sweet white wine - control | 8.07 |
| Sweet white wine - sulfite | 8.08 |
| Sweet white wine - Oxyrase | 5.25 |

The results indicated that only the wine treated with the cell membrane fragments from the organism Escherichia coli (i.e. "Oxyrase") showed a reduction in the quantity of the reintroduced oxygen with time. Hence, unlike sulfites, the cell membrane fragments utilized in the present invention maintained their activities even after eight weeks.

EXAMPLE 5

In order to obtain cell membrane fragments having low pH optimum electron transport systems, the cell membrane fragments of a number of acidic strains of organisms were evaluated. In this regard, the inventors discovered that organisms from the genus Acetobacter were particularly well suited for removing oxygen not only from acidic solutions but also from solutions containing ethanol. This was particularly interesting because although the organisms of the genus Acetobacter are not the most acidic strains of organisms available, various species of Acetobacter are compatible with food products.

Along this line, the present inventors have discovered that the organism Acetobacter aceti, ATCC No. 23746 (NCIB 8554) is an excellent source for cell membrane fragments ("Aceto-Oxyrase") having an electron transport system which is optimum at low pHs. In addition, not only was the electron transport system of the cell membrane fragments from Acetobacter aceti (i.e. "Aceto-Oxyrase") effective in acidic solutions, they were also effective in solutions containing ethanol.

Specifically, the relative pH activities of the electron transport system of cell membrane fragment of the organism Acetobacter aceti in 0.02M $KH_2PO_4$ + 10 mM lactate at 37° C. (i.e. 40μ of cell membrane fragments which is equivalent to 1.32 units of Oxyrase activity measured at optimal pH) were determined and set forth below in Table 6.

TABLE 6

| THE pH OPTIMUM OF ACETO-OXYRASE IN 0.2 M $KH_2PO_4$ + 10 mM LACTATE AT 37° C. | | |
| --- | --- | --- |
| pH | Time for Complete Oxygen Removal (sec.) | % of Maximum Activity |
| 3.5 | 1328 (22.1 min.) | 9.90 |
| 4.0 | 480 (8.0 min.) | 27.50 |
| 4.5 | 212 (3.53 min.) | 62.30 |
| 5.1 | 132 (2.2 min.) | 100.00 |
| 5.4 | 132 (2.2 min.) | 100.00 |
| 6.1 | 168 (2.8 min.) | 78.60 |
| 7.0 | 284 (4.7 min.) | 46.50 |
| 8.0 | 1448 (24.1 min.) | 9.10 |
| 8.0 | 156 (2.6 min.) | |

The data indicated that the optimum pH for the electron transport system of the cell membrane fragments of the organism Acetobacter aceti (Aceto-Oxyrase) is about 5.2, with an operational range from at least about 3 to about 8.0. This is in sharp contrast to the activity of the electron transport system present in the cell membrane fragments of the organism Escherichia coli, which has an optimum pH of 8.4 and an operational range from about 6.0 to about 9.0. As a result, this novel type of electron transport system used as an antioxidant for solutions containing alcohols and acids has not been described before.

Furthermore, when the activity of the electron transport system present in the cell membrane fragments of Escherichia coli (i.e. E.C. 100 from Oxyrase, Inc., Ashland, Ohio) in white wine at a pH=3.4 was compared with that of the cell membrane fragments of Acetobacter aceti (i.e. "Aceto-Oxyrase") (See Table 7 below), the data indicated that the Aceto-Oxyrase removed all of the dissolve oxygen in white wine at 37° C. in 79.1 minutes, and at 32° C., in only 29.3 minutes. The electron transport system of the cell membrane fragments of the organism Escherichia coli showed no activity at this pH. In addition, the data showed that the electron transport system from the cell membrane fragments of the organism Acetobacter aceti was more effective i.e. had a higher activity at a lower temperature than that of Escherichia coli. This is particularly interesting since the optimal storage conditions of many low pH and/or ethanol solutions is at lower temperatures.

TABLE 7

| ACTIVITY OF ACETO-OXYRASE AND EC 100 IN WHITE WINE pH 3.4 | | |
| --- | --- | --- |
| | Temperature | Time for Complete Oxygen Removal |
| EC 100 | 37° C. | 00 |
| EC 100 | 32° C. | 00 |
| Aceto-oxyrase | 37° C. | 4748 secs. or 79.1 min. |
| Aceto-oxyrase | 32° C. | 1760 secs. or 29.3 min. |

EXAMPLE 6

The amount of time required for the electron transport system present in the membrane fragments of the organism Acetobacter aceti (i.e. "Aceto-Oxyrase") to remove the dissolved oxygen completely from a number of solutions containing acids and/or alcohols was determined according to a procedure modified somewhat from that indicated above. The modified procedure was necessary in order to enhance the readings produced by the Oxygraph oxygen sensor. Preliminary experiments according to the unmodified procedure indicated that the bubbles of certain carbonated beverages, such as beer, as well as particles in the solutions, such as the vegetable particles in tomato juice, interfered with the ability of electrode in the oxygen sensor to produce smooth tracings or readings.

In order to avoid these difficulties, the carbonated beverages were first degassed by repeated shaking at room temperature and/or the solutions were filtered or clarified by centrifugation at 3,000 rpm for 10 minutes prior to analysis. The treated solutions, i.e. beer or tomato juice, were then introduced into the Oxygraph chamber until the chamber was completely filled (i.e. approximately 1.75 ml). Since the solutions, i.e. beer and tomato juice, contained natural substrates, the addition of substrates to the solution was not necessary. The samples were equilibrated at 25° C. for five minutes. After equilibration the oxygen saturation value was obtained and then 40 μl of "Aceto-oxyrase"(i.e. cell membrane fragments from the organism *Acetobacter aceti*, approximately 28 mg/ml dry weight) was injected into the samples. The time required to remove all measurable oxygen was determined and set forth below in Table 8.

TABLE 8
TIME REQUIRED FOR ACETO-OXYRASE TO REMOVE THE OXYGEN IN VARIOUS SOLUTIONS

| Solution | pH | Time (min.) Required to remove 50% of initial Oxygen | Time (min.) Required to remove 100% of initial Oxygen |
|---|---|---|---|
| Tomato Juice (Campbell's Soup Co. Camden, NJ) | 4.0 | 5.6 | 11.4 |
| Michelob Beer (trademarked and sold by Anheuser-Busch, Inc., St. Louis, MO) | 4.7 | 2.8 | 5.3 |

The results indicated that although the electron transport system present in the membrane fragments of the organism *Acetobacter aceti* (i.e. "Aceto-Oxyrase") was being utilized below its optimum pH (which is approximately 5.3), the electron transport system present in the membrane fragments successfully removed all of the oxygen from both beer and tomato juice at 25° C. in a relatively short period of time.

In order to determine whether the electron transport system present in membrane fragments of the organism *Acetobacter aceti* (i.e. "Aceto-Oxyrase") was effective in fairly acidic solutions which failed to contain natural hydrogen donating substrates, a similar test to that set forth above was performed in solutions of Classic Coke (trademarked and sold by The Coca-Cola Co., Atlanta, Ga.) containing the added substrate, sodium lactate. In this regard, previous experiments had indicated that no substrate was naturally present in Classic Coke, thus 20 μl of a 1M sodium lactate solution was also introduced into the test chamber containing the Classic Coke. The procedure utilized was the same as that used for the beer and tomato juice except that the analysis was performed at 15–18° C., rather than 25° C. The time required to remove all measurable oxygen was determined and set forth below in Table 9.

TABLE 9
TIME REQUIRED FOR ACETO-OXYRASE TO REMOVE OXYGEN IN CLASSIC COKE

| Solution | pH | Time (min.) Required to remove 50% of initial Oxygen | Time (min.) Required to remove 100% of initial Oxygen |
|---|---|---|---|
| Classic Coke (The Coca-Cola Co., Altanta, GA) | 3.0 | 6.0 min. | 12.0 min. |

The results indicate that the electron transport system present in the membrane fragments of the organism *Acetobacter aceti* (i.e. "Aceto-Oxyrase") was effective in removing oxygen from fairly acidic solutions which failed to contain natural substrates, if a substrate was subsequently added to the sample.

EXAMPLE 7

In order to determine the effectiveness of the membrane fragments for controlling the enzymatic "browning" reaction which occurs in the oxidation degradation of fruits and vegetables, samples of sliced fruit and vegetables were coated with a solution of the membrane fragments. The effects the treatments had on the "browning" of the samples were observed.

Specifically, samples of sliced or cut apples (pH=3–4), bananas (pH=4.5–5), and potatoes (pH=6.5) were placed into separate solutions of membrane fragments from the organism *Escherichia coli* (0.3 units/ml of membrane fragments). In addition, samples of sliced apples, bananas and potatoes were placed in a lactate solution (0.01M sodium lactate), a substrate for the cell membrane fragments, to serve as controls. The effectiveness of the membrane fragments for controlling the browning of the samples was visually observed at both ambient (i.e. 18°–20° C.) and refrigerator (i.e. 4° C.) temperatures and the earliest time of noticeable browning occurring was recorded. The results indicated that although the browning reactions of the samples of sliced apples and bananas were unaffected by the membrane fragments, (i.e. the fruit turned brown over time) a strong positive result (i.e. no observable color change) was obtained from the sample of sliced potatoes in the *Escherichia coli* membrane fragments at ambient temperatures when compared to the controls. In this regard, the treatment of the potato slices in the solution of the cell membrane fragments from the organism *Escherichia coli* delayed the onset of browning for period of about five times (5×) as long as that observed in the control.

Furthermore, by maintaining the sample of the sliced potatoes in the solution of the membrane fragments at refrigeration temperature (i.e. 4° C.), the browning reaction was delayed about seven times (7×) as long as that observed in the lactate control at ambient temperature (i.e. 18°–20° C.). However, when compared to lactate controls at refrigerated temperatures (i.e. 4° C.), the browning reaction was delayed only slightly (i.e. 20 to 60%).

The failure of the membrane fragments of the organism *Escherichia coli* in controlling the browning reaction of the sliced apples and bananas was attributed to the low pH of the respective fruit. As indicated above, the electron transport system present in the membrane fragments of the organism *Escherichia coli* has an optimal pH=8.4 and an operating range of about 6 to about 9. Thus, the membrane fragments of the organism *Escherichia coli* were only effective in controlling the browning reaction of the potatoes having a pH of 6.5.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims and the equivalent thereof.

Having thus described the preferred embodiments, the invention is now claimed to be:

1. A method for removing oxygen from a food stuff or beverage solution containing alcohol comprising the steps of:
   (a) providing a food stuff or beverage solution containing alcohol; and,
   (b) adding to the solution a sufficient amount of oxygen scavenging membrane fragments to reduce the oxygen present in the solution to water.

2. The method of claim 1, wherein said alcohol solution comprises from about 1 to about 18 weight percent ethyl alcohol.

3. The method of claim 1, wherein said alcohol solution comprises about 9.5 weight percent ethyl alcohol.

4. The method of claim 1, wherein oxygen scavenging membrane fragments contain an electron transport system which reduces oxygen to water in solutions containing alcohol.

5. The method of claim 1, wherein said oxygen scavenging membrane fragments are derived from bacteria, yeast, fungi, plants and animals selected from the group consisting of beef heart, potato tubers, spinach, Saccharomvces, Neurospora, Aspergillus, Euglena, Acetobacter, Chlamydomonas, Escherichia, Bacillus, Salmonella, Gluconobacter, and Pseudomonas.

6. The method of claim 1, wherein said oxygen scavenging membrane fragments are cell membrane fragments derived from the organism *Escherichia coli*.

7. The method of claim 1, wherein said alcohol solution is adjusted to a pH of about 7.

8. The method of claim 1, wherein said alcohol solution is adjusted to a pH of about 8.4.

9. The method of claim 1, wherein said alcohol solution is beer.

10. The method of claim 1, wherein said alcohol solution is wine.

11. The method of claim 1, further comprising the step of adding an organic substrate to the solution containing alcohol.

12. The method of claim 11, wherein said substrate is a compound selected from the group consisting of lactic acid, succinic acid, alpha-glycerol phosphate, formic acid, and malic acid or corresponding salts thereof.

13. The method of claim 1, further comprising the step of adjusting the pH of the alcohol solution to a pH of about 6 to about 9 prior to the addition of the oxygen scavenging membrane fragments.

14. A method for removing oxygen from an acidic alcohol food stuff or beverage solution comprising the steps of:
   (a) providing an acidic alcohol food stuff or beverage solution containing oxygen; and
   (b) adding to the solution a sufficient amount of oxygen scavenging cell membrane fragments from an organism of the genus Acetobacter to reduce the oxygen present in the solution to water.

15. The method of claim 14, wherein said acidic ethanol solution comprises an ethanol solution having a pH between 2.5 and 7.

16. The method of claim 15, wherein said acidic ethanol solution comprises an acidic solution containing from about 1 to about 18 weight percent alcohol.

17. The method of claim 14, wherein said acidic alcohol solution comprises an acidic solution containing about 9.5 weight percent ethanol.

18. The method of claim 14, wherein said acidic alcohol solution comprises an acidic solution containing about 13 weight percent ethanol.

* * * * *